Patented July 8, 1947

2,423,641

UNITED STATES PATENT OFFICE 2,423,641

PROCESS FOR THE PREPARATION OF THIOL ESTERS

Ellsworth Knowlton Ellingboe, Wilmington, Del., assignor to E. I. du Pont de Nemours & Company, Wilmington, Del., a corporation of Delaware No Drawing. Application June 20, 1944, Serial No. 541,291

4 Claims. (Cl. 260—455)

This invention relates to the preparation of carbothiolic esters.

This application is a continuation-in-part of my application Ser. No. 476,625, filed February 20, 1943, now abandoned.

This invention has as an object the preparation of esters. A further object is the preparation of mixed esters, i. e., esters of a plurality of acids. A still further object is the preparation of mixed sulfur-containing esters of organic and inorganic acids. Another object is the preparation of beta- mercaptoalkyl halides by the controlled hydrolysis of beta-(acylthio) alkyl halides. Other objects will appear hereinafter.

These objects are accomplished by the following invention wherein a monomeric alpha-unsaturated aliphatic, including cycloaliphatic, alcohol ester of an organic or inorganic acid is reacted, preferably in the liquid phase, with an organic carbothiolic acid in the presence of oxygen or a peroxide, i. e., a catalyst having two directly linked oxygen atoms, to produce an ester of a beta-(acylthio) alkanol. The resulting esters in the case of the halide-carbothiolate compounds may be hydrolyzed to the halide-thiols.

The preferred method of preparing substituted alkyl thiol esters according to this invention comprises mixing and agitating approximately equivalent amounts of an ester of an alpha-unsaturated alcohol and of a thiol carboxylic acid in the presence of oxygen or a peroxide. The reaction is characterized by the evolution of heat, which may be controlled either by cooling, by the gradual introduction of one of the reactants, or by metering the oxygen, air or peroxide added to promote the reaction. The reaction which takes place is illustrated by the equation

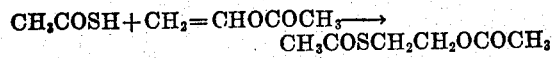

representing the reaction of thiolacetic acid with vinyl acetate to give 2-acetoxyethyl thiolacetate.

The reaction temperature is not critical so long as it is below the decomposition temperature, and it is governed largely by practical considerations such as the nature of the apparatus, the boiling points of the reactants, etc. Temperatures of −50 to +200° C. are preferred. The process may be carried out at subatmospheric, ordinary or superatmospheric pressures, if desired in the vapor phase but preferably in the liquid phase. When no further heat is evolved on free exposure of the reaction mixture to air or oxygen the reaction is essentially complete and the product may be isolated after a short confirmatory period. The presence of oxygen or a peroxide in catalytic amounts appears to be essential to the success of the reaction, as indicated by experiment.

The apparatus in which the reactions are carried out can be of ordinarily available types, such as an autoclave or a vessel equipped with a reflux condenser. The vessel should also be equipped with a stirrer, heat transfer facilities and means for introducing liquid or solid and gaseous reactants independently.

The reaction may be carried out by batch or continuous process and in the vapor or liquid phase, preferably the latter.

The more detailed practice of the invention is illustrated by the following examples, wherein parts given are by weight. There are of course many forms of the invention other than these specific embodiments.

Example I

A mixture of 10.6 parts of thiolacetic acid with 5.1 parts of vinyl thiolacetate is agitated in a vessel open to the air. Within a short time the mixture becomes quite warm, and heat is evolved over a period of several minutes. When the spontaneous reaction ceases, with the mixture having free access to fresh air, large white crystals of ethane-1,2-dithiol diacetate are formed as the mixture cools. The crude crystals, after pressing on a clay plate, are obtained in a yield of 9.8 parts by weight; M. P. 68–73° C.

Similar results are obtained, but more slowly and with no noticeable heat, when 1% of benzoyl peroxide is used as the catalyst and the mixture kept under an inert (nitrogen) atmosphere. No reaction occurs in the complete absence of air or benzoyl peroxide.

Example II

A mixture of 86 parts of vinyl acetate and 76 parts of thiolacetic acid is stirred in a vessel provided with a reflux condenser. A slow current of air is passed through the reaction mixture. Almost immediately a vigorous evolution of heat takes place and the mixture soon reaches refluxing temperature. The process is continued for an hour, during which time the evolution of heat decreases to nothing. The reaction mixture is finally distilled under reduced pressure to give a nearly quantitative yield of 2-acetoxyethyl thiolacetate boiling at 95–105° C./10 mm., 95% of this material boiling at 97–98°/10 mm.

Example III

A mixture of 66.5 parts of vinyl chloride and 76 parts of thiolacetic acid is placed in a pressure vessel, previously cooled in a carbon dioxide-acetone bath. After flushing the space above the charge with air, the vessel is closed and the contents allowed to warm up to room temperature with frequent agitation. No spontaneous rise above room temperature is noted. After a short interval the mixture is again cooled, the vessel opened, fresh air added and, after closing, the reaction is continued by warming to room temperature with frequent agitation as before. This process is again repeated, and finally the reaction mixture is placed in a still and distilled. A yield of 74.2 parts of 2-chloroethyl thiolacetate boiling at 114.5°/101 mm. is obtained.

The halogen acid esters of beta-(carboxythio) alkanols obtained in accordance with the process of this invention as illustrated in Example III can be converted to the corresponding beta-mercaptoalkyl halides by hydrolyzing the carboxythio group to the mercapto group by treatment with an alcohol in the presence of an acidic catalyst. This reaction, which may be called hydrolysis, alcoholysis or ester interchange, is illustrated by the equation:

It affords a convenient means of passing in two steps from a vinyl halide to the corresponding beta-mercaptoethyl halide. The halogen group is substantially unaffected during the hydrolytic step. The following example illustrates this hydrolytic process.

Example IV

A mixture of 75 parts of 2-chloroethyl thiolacetate and 150 parts of anhydrous methanol containing 1.5 parts of dry hydrogen chloride is refluxed for one hour, then fractionated. The fraction boiling at 114–116° C. is essentially pure beta-mercaptoethyl chloride, which is a colorless liquid having a thiol content of about 34.2%. The yield is 45–50 parts or 86–96% of the theoretical.

While the examples illustrate the invention as applied to thiolacetic acid, there may be employed any carbothiolic acid which is stable under the conditions of the reaction, including thiolacetic, dithioladipic, thiolpropionic, thiolbutyric, monothioladipic, thiolfuroic, thiolnicotinic, thiolphenecarbothiolic, thiolnaphthoic, thiolbenzoic, and thiolphthalic acids. The acid is preferably saturated and preferably hydrocarbon apart from the acid, i. e., carbothiolic group.

Any monomeric alpha-unsaturated aliphatic alcohol ester of an organic or inorganic acid, in which acid hydrogen or hydrogens are replaced by a monovalent aliphatic, including cycloaliphatic, radical having a double bond between the carbon attached to the acid radical and the carbon once removed therefrom may be employed, including vinyl acetate, vinyl benzoate, vinyl chloride, divinyl adipate, vinyl thiolacetate, 1-propenyl acetate, 1-cyclohexenyl acetate, 1,3-butadienyl acetate. Acyclic and particularly vinyl esters are preferred because of their greater availability, and of the esters of organic acids those of saturated fatty acids are particularly preferred.

The reaction must be conducted in the presence of oxygen, air, or a peroxide (e. g., benzoyl peroxide, diethyl peroxide, acetyl peroxide, etc.) and must be conducted in a non-alkaline, i. e., neutral to acid environment, i. e., in the absence of alkaline substances. These have been found to inhibit the reaction. When a solid catalyst (peroxide) is employed, less than 5%, by weight, of reactants, of catalyst is in general sufficient. The reaction is best conducted in the liquid phase, i. e., at a temperature such that the reactants are liquid. The temperature must not exceed the decomposition point either of reactants or products. The reaction appears to be essentially quantitative when using equivalent amounts of the reactants, but no harm has been found in employing an excess of either of them.

The hydrolytic reaction by means of which the beta-(carboxythio) alkyl halides are converted to the corresponding beta-mercaptoalkyl halides may be carried out in the presence of any alcohol. Obviously, it is preferable to use a cheap and readily available alcohol, and for this reason the lower alkanols, i. e., alkanols of up to seven carbon atoms, are preferred, in particular methyl, ethyl and isopropyl alcohols. The catalyst may be any ester interchange acidic catalysts, i. e., those commonly used in ester interchange reactions, such as hydrochloric acid, sulfuric acid, phosphoric acid, p-toluenesulfonic acid, sodium dihydrogen phosphate, etc. Any beta-(carboxythio) alkyl halide may be used, but the chlorides and bromides, particularly the former, are more available and therefore preferred. Preferably a non-oxidizing acid of ionization constant of at least $1 \times 10^{-5}$ is used.

The present invention is of advantage in providing a practical method for making thiol esters of types which are often difficult to obtain by any other means. The resulting thiol esters are useful as intermediates for further synthesis, being especially a source of the corresponding thiols and in certain cases of unsaturated thiol esters, e. g., vinyl thiolacetate by pyrolysis from 2-acetoxyethyl thiolacetate. A particularly preferred advantage of this invention is that it affords a means of obtaining compounds having the mercaptan group on a carbon adjacent a halogen-bearing carbon, e. g., a chlorine-bearing carbon. These are valuable intermediates in the synthesis of sulfur-containing amino acids such as cystine, homocystine, and methionine.

The above description and example are intended to be illustrative only. Any modification of or variation therefrom which conforms to the spirit of the invention is intended to be included within the scope of the claims.

What is claimed is:

1. Process for the preparation of thiol esters which comprises reacting thiolacetic acid in a neutral to acid liquid environment at a temperature from −50° C. to +200° C., with a vinyl ester of the class consisting of vinyl chloride, vinyl acetate, and vinyl thiolacetate in the presence of a catalyst containing two directly linked oxygen atoms and selected from the class consisting of peroxides and molecular oxygen.

2. Process for the preparation of thiol esters which comprises reacting thiolacetic acid in a neutral to acid liquid environment at a temperature from −50° C. to +200° C., with vinyl chloride in the presence of oxygen.

3. Process for the preparation of thiol esters which comprises reacting thiolacetic acid in a neutral to acid liquid environment at a temperature from −50° C. to +200° C., with vinyl acetate in the presence of oxygen.

4. Process for the preparation of thiol esters which comprises reacting thiolacetic acid in a neutral to acid liquid environment at a temperature from −50° C. to +200° C., with a vinyl ester of the class consisting of vinyl chloride, vinyl acetate, and vinyl thiolacetate in the presence of oxygen.

ELLSWORTH KNOWLTON ELLINGBOE.

REFERENCES CITED

The following references are of record in the file of this patent:

UNITED STATES PATENTS

| Number | Name | Date |
|---|---|---|
| 2,212,141 | Alderman | Aug. 20, 1940 |
| 2,212,895 | Allen | Aug. 27, 1940 |

FOREIGN PATENTS

| Number | Country | Date |
|---|---|---|
| 521,944 | Great Britain | June 5, 1940 |

OTHER REFERENCES

Sjoberg (1), "Ber. Deut. Chem.," vol. 74B, pp. 64–72 (1941).

Sjoberg (2), "Ber. Deut. Chem.," vol. 75B, pp. 13–29 (1942).

Mayo, "Chem. Reviews," vol. 27, pp. 387–393.

Beilstein, "Handbuch der Organischen Chemie," 4th ed., vol. I, 2d supplement, page 347.

Chemical Abstracts, vol. 35, cols. 5092–5094, abstract of article by Sjoberg.

Chemical Abstracts, vol. 35, cols. 2113, 2114, abstract of article by Sjoberg.